(12) United States Patent
Klemenz et al.

(10) Patent No.: US 9,367,199 B2
(45) Date of Patent: Jun. 14, 2016

(54) DYNAMICAL AND SMART POSITIONING OF HELP OVERLAY GRAPHICS IN A FORMATION OF USER INTERFACE ELEMENTS

(71) Applicants: Oliver Klemenz, Hoffenheim (DE); Peter Eberlein, Malsch (DE)

(72) Inventors: Oliver Klemenz, Hoffenheim (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 111 days.

(21) Appl. No.: 13/714,026

(22) Filed: Dec. 13, 2012

(65) Prior Publication Data
US 2014/0173474 A1 Jun. 19, 2014

(51) Int. Cl.
*G06F 3/0481* (2013.01)
*G06F 9/44* (2006.01)

(52) U.S. Cl.
CPC ............ *G06F 3/0481* (2013.01); *G06F 9/4446* (2013.01)

(58) Field of Classification Search
USPC .......................... 715/705, 708, 711, 712, 715
See application file for complete search history.

(56) References Cited

U.S. PATENT DOCUMENTS

| | | | |
|---|---|---|---|
| 4,648,062 A * | 3/1987 | Johnson et al. ................ | 715/708 |
| 4,964,077 A * | 10/1990 | Eisen .................... | G06F 9/4446 434/118 |
| 5,287,448 A * | 2/1994 | Nicol et al. .................... | 715/707 |
| 5,689,717 A * | 11/1997 | Pritt .............................. | 715/234 |
| 6,489,976 B1 | 12/2002 | Patil et al. | |
| 6,542,163 B2 * | 4/2003 | Gorbet et al. ................. | 715/711 |
| 6,717,589 B1 | 4/2004 | Grillo et al. | |
| 7,203,737 B2 * | 4/2007 | Starbuck et al. .............. | 709/219 |
| 8,001,470 B1 * | 8/2011 | Chen et al. .................... | 715/714 |
| 2003/0058267 A1 * | 3/2003 | Warren ............ | G06F 17/30716 715/705 |
| 2005/0268234 A1 * | 12/2005 | Rossi et al. ................... | 715/705 |
| 2006/0005159 A1 | 1/2006 | Nakamoto et al. | |
| 2007/0113180 A1 * | 5/2007 | Danninger .................... | 715/705 |
| 2011/0271185 A1 * | 11/2011 | Chen et al. ................... | 715/708 |
| 2013/0238990 A1 * | 9/2013 | Ubillos et al. ................ | 715/708 |

FOREIGN PATENT DOCUMENTS

| | | |
|---|---|---|
| EP | 1603031 A2 | 12/2005 |
| EP | 1760582 A2 | 3/2007 |

OTHER PUBLICATIONS

Galitz, Wilbert. "The Essential Guide to User Interface Design" Third Ed., Wiley (2007).*

(Continued)

*Primary Examiner* — Doon Chow
*Assistant Examiner* — James T Tsai
(74) *Attorney, Agent, or Firm* — Mintz Levin Cohn Ferris Glovsky and Popco, P.C.

(57) ABSTRACT

In some example implementations, there is provided a method. The method may include selecting an action element located on a user interface, wherein the user interface includes a plurality of action elements, whereby each action element corresponds to an action performable by a user and causing a change in a state of the user interface; identifying a help overlay graphics element for each selected action element in the plurality of action elements, the help overlay graphics element describing the action corresponding to the selected action element; and dynamically positioning a plurality of help overlay graphics elements identified for at least a portion of the plurality of selected action elements on the user interface, wherein the plurality of help overlay graphics elements are positioned proximate to associated action elements. Related systems, methods, and articles of manufacture are also provided.

10 Claims, 4 Drawing Sheets

(56) References Cited

OTHER PUBLICATIONS

Mgconsulting (blog) "Scroll through Ribbon Tabs in Office 2007 and 2010," (Jun. 25, 2009), last accessed at http://mgconsulting.wordpress.com/2009/06/25/office-2007-ribbon-tips/, Aug. 12, 2014.*

European Search report dated Feb. 4, 2014 for corresponding European patent application No. 13005057.8.

* cited by examiner

DYNAMICAL AND SMART POSITIONING OF HELP OVERLAY GRAPHICS IN A FORMATION OF USER INTERFACE ELEMENTS

TECHNICAL FIELD

This disclosure relates generally to data processing and, in particular, to positioning of help overlay graphics on a user interface of a computing system.

BACKGROUND

Software applications are typically designed to include a variety of functionalities that the user can employ to perform various tasks. Examples of applications can include word processing applications, presentation applications, business process applications, and/or any other types of software applications. Word processing software applications can include functionalities such as, changing a size, font, color, appearance, etc. of the text that the user may be inputting using user's computing device. Presentation software applications can include functionalities for creation, editing, manipulation, deletion, etc. of presentation slides that can form part of a presentation that the user is creating. Business process software applications (e.g., sales order processing applications) can include functionalities that deal with various ways to create, edit, manipulate, etc. business process data. Other applications can include various other functionalities.

Many software applications can include a complex formation of nested user interface elements and user interface layouts. Some of these elements and/or layouts might not be easily understandable to a user, and especially, a first time user. Thus, providing help to the user to ease the use, interaction, configurability, etc. of the application may be necessary. This is especially true when dealing with business applications having many elements, functional features, high configurability, etc.

Most of the software applications are packaged with special applications that allow users to learn and understand what the various functionalities are and how to use them. Such special applications are typically referred to as help files and/or applications. In a software application, the help files or applications are typically identified by a "question mark" button, a "help" button, a "help" menu, and/or in any other fashion on a user interface of the software application. The user may activate such help files/applications by pressing or clicking the button (or performing any other action) corresponding to the help files/applications on the user interface. The software application can then generate a help screen or a help interface that can include a variety of topics that may be of interest to the user with regard to a specific functionality of the software application. The user can search for various help topics that can relate to the functionality of interest. However, because many software applications provide such help in separate documents or even in separate applications, the user has to suffer a disruption between the application and the help representation, as the context of the application mostly gets lost when entering the help from the application. Additionally, the help and the software application itself may diverge over time, thereby posing a risk of damaging the application and/or any associated data when a user performs an incorrect action, per advice by an outdated help application. Hence, the conventional help files/applications include static and incomplete application documentation as well as provide an inconvenient and frustrating way of access them to the user. Thus, there is a need to provide a more dynamic help application for a software application.

SUMMARY

In some example implementations, there is provided a method. The method may include selecting an action element located on a user interface, wherein the user interface includes a plurality of action elements, whereby each action element corresponds to an action performable by a user and causing a change in a state of the user interface; identifying a help overlay graphics element for each selected action element in the plurality of action elements, the help overlay graphics element describing the action corresponding to the selected action element; and dynamically positioning a plurality of help overlay graphics elements identified for at least a portion of the plurality of selected action elements on the user interface, wherein the plurality of help overlay graphics elements are positioned proximate to associated action elements, wherein a position of one identified help overlay graphics element is dependent on a position of another help overlay graphics element; wherein at least one of the selecting, the identifying, and the dynamically positioning is performed using at least one processor.

In some variations, one or more of the following features can optionally be included in any feasible combination. The dynamically positioning may further comprise determining coordinates of each action element in the at least a portion of the plurality of selected action elements on the user interface and determining positioning coordinates of the plurality of help overlay graphics elements using at least one of the following: the coordinates of the each action element in the at least a portion of the plurality of selected action elements and coordinates of bounding boxes surrounding each help overlay graphics element in the plurality of help overlay graphics elements; wherein the plurality of help overlay graphics elements positioned on the user interface are positioned without having their corresponding bounding boxes overlap each other on the user interface. The dynamically positioning may further comprise determining that the user interface includes at least two action elements each corresponding to the same action and displaying a help overlay graphics element corresponding to one of the at least two action elements. The dynamically positioning may further comprise displaying a first help overlay graphics element corresponding to a first action element in the plurality of action elements and not displaying a second help overlay graphics element corresponding to a second action element in the plurality of action elements. The dynamically positioning may further comprise preventing displaying of a help overlay graphics element corresponding to an action element corresponding to an action previously performed by a user. The at least one action element may determine at least one of the following: existence of a corresponding help overlay graphics element on the user interface, appearance of the corresponding help overlay graphics element on the user interface, positioning and direction of the corresponding help overlay graphics element on the user interface, and behavior of the corresponding help overlay graphics element on the user interface. The at least one action element may include a plurality of corresponding help overlay graphics elements, wherein each help overlay graphics element in the plurality of corresponding help overlay graphics element is displayed on the user interface based on a predetermined order. The help overlay graphics element may be displayed based on at least one of the following: a visibility of at least one action element on the user interface, an importance of the help overlay graphics element, and a historical usage of the help overlay graphics element. The identifying may further include obtaining a metadata associated with the selected action element and identifying, based on the obtained metadata, the help overlay graphics element. The help overlay graphics element may include a text graphic describing the action corresponding to the selected action element and an arrow graphic pointing to a location of the selected action element on the user interface.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the above-noted and potentially other deficiencies of currently available solutions, one or more implementations of the current subject matter provide methods, systems, articles or manufacture, and the like that can, among other possible advantages, provide systems and methods for providing systems, methods, and computer program products for positioning of help overlay graphics on a user interface of a computing system.

In some implementations, the current subject matter relates to a computing system that can provide a user with an intuitive help overlay graphics, thereby providing the user with the requisite assistance in working with a software application. The software application can be implemented on a user's computing device, which can include a processor, a memory, an input/output device (e.g., a keyboard, a mouse, a monitor, etc.). The software application can present the user with a user interface that can include a plurality of user interface elements. The user interface can be used by the user to input various software commands that can correspond to various actions that can be performed by the software application. The user interface can also be used by the user to view output of various actions performed by the software application. The user interface elements can be in the form of screens, tiles, menus, buttons, pointers, and/or any other features. The user interface elements can be used by the user to cause the software application to perform an action (e.g., clicking a button to "bold" the text displayed on the user interface). The user interface can have a plurality of user interface elements. Some such elements can be identical to one another. Some elements can be displayed on the user interface while others can be hidden from view but can become viewable upon the software application performing an action to make such elements viewable. The user interface elements can also correspond to actions, such as, application settings, adjustment of user interface appearance and its elements, removal of elements from user interface, as well as any other functionality, and/or a combination thereof.

Figure 1:
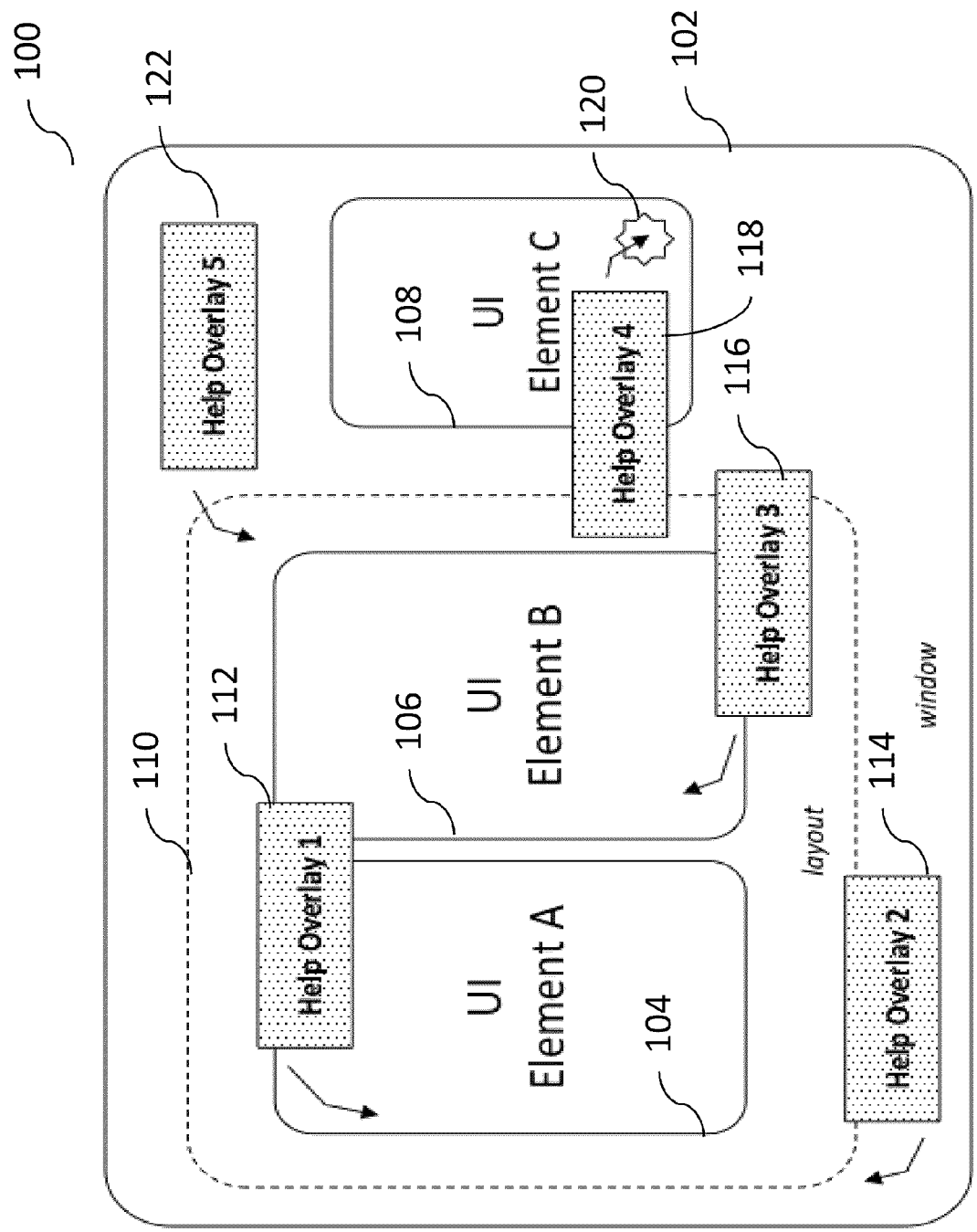
FIG. 1 illustrates an exemplary system for providing positioning of help overlay graphics elements on a user interface of a software application, according to some implementations of the current subject matter.

FIG. 1 illustrates an exemplary user interface 100, according to some implementations of the current subject matter. The user interface 100 includes a plurality of user interface elements: element A 104, element B 106, and element C 108. Elements A and B are part of a layout 110 that can also be part of the user interface 100. The element C 108 can be a standalone user interface element. The user interface can also include a plurality of help overlay graphics elements that can be associated with elements 104, 106, and 108 as well as various parts of the elements 104, 106, 108. The help overlay graphics elements can also be associated with collections of user interface elements, such as the layout 110.

As shown in FIG. 1, the user interface element A 104 can include a help overlay graphics element 112, the user interface element B can include a help overlay graphics element 116, and the user interface element C 108 can include a help overlay graphics element 118. The layout 110 can also include a help overlay graphics element 122. The user interface 102 can include a help overlay graphics 114. The help overlay graphics elements can provide the user with an explanation of how user interface, layout of user interface elements, user interface elements, and/or parts of user interface elements can operate and/or what types of actions they can perform. For example, the user interface element C 108 can include a settings button 120, where the help overlay graphics element 118 can explain how the settings button 120 can work or what actions can correspond to or be associated with the settings button.

Figure 2:
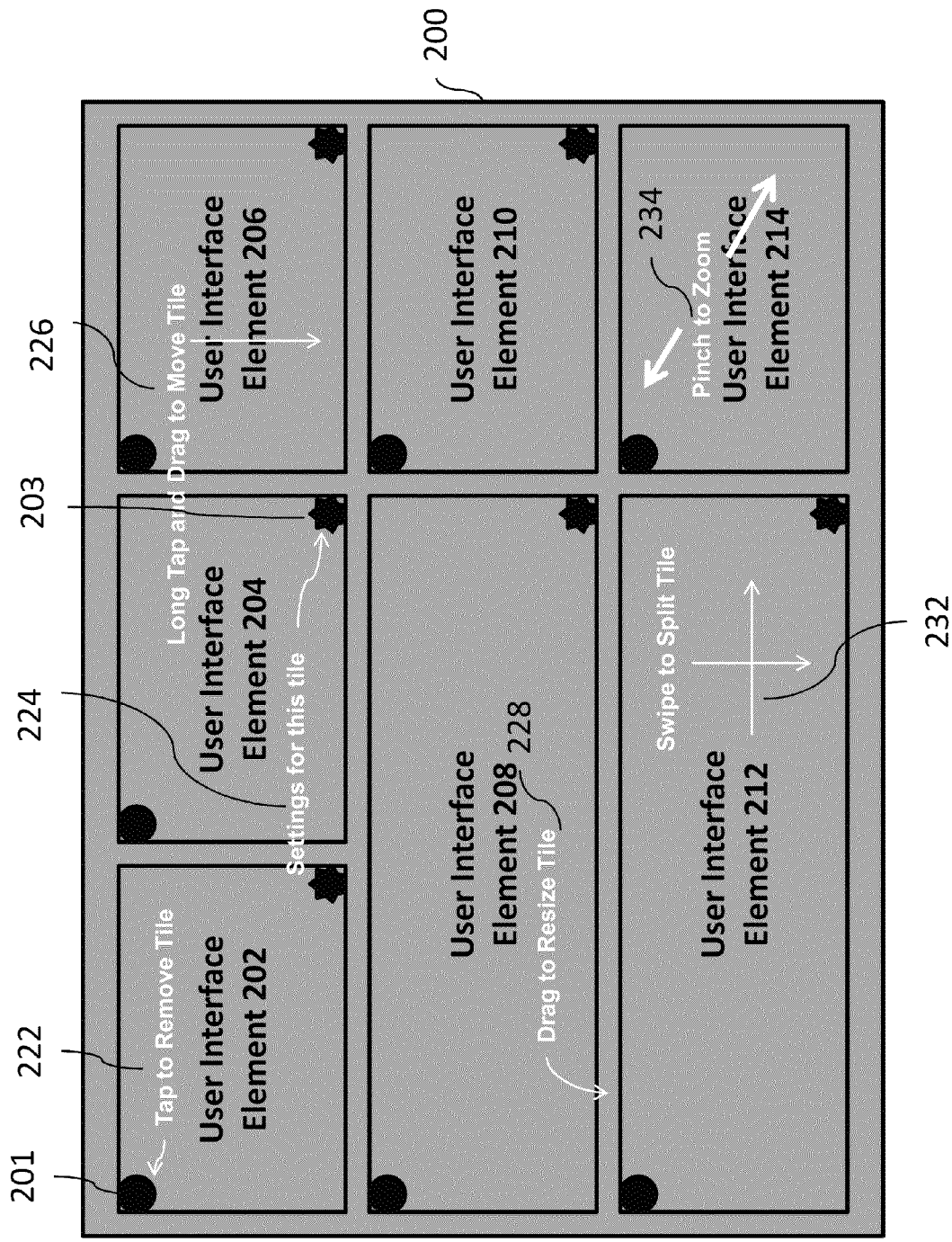
FIG. 2 illustrates another exemplary system for providing positioning of help overlay graphics elements on a user interface of a software application, according to some implementations of the current subject matter.

FIG. 2 illustrates another exemplary system 200 for positioning of help overlay graphics elements in a formation of user interface elements, according to some implementations of the current subject matter. The user interface (shown shaded, which indicates that the actual user interface is concealed or in an inactive mode and that a help overlay graphics element are displayed in an active mode) can include a plurality of user interface elements 202, 204, 206, 208, 210, 212, and 214. The user interface elements 202-214 can relate to a single software application or different software applications and can include at least one action element. The applications can be a word processing application, a presentation application, a business process application, and/or any other type of software application. An example of an action element can include a "close" button 201 (similar "close" buttons are shown as black dots in each user interface element 202-214) or a "settings" button 203 shown in the user interface 202 (simile "settings" buttons are shown as black stars in each user interface element 204-212 (not in user interface element 214)). By selecting or clicking on the button 201, the user is able to close (or otherwise remove it from the user interface and thereby, remove it from view of the user) the user interface element 202. By selecting or clicking on the button 203, the user is able to activate settings controls for the user interface element 202 (e.g., font of text appearing in the user interface element 202, size of text, etc.). The selection or clicking can be done using any conventional techniques. The user interface elements can include a plurality of other action elements, which can be used to change appearance of the user interface elements (e.g., change size, shape, etc. of the user interface element), move user interface elements to different locations on the user interface, and/or otherwise manipulate user interface elements in any desired fashion.

The user of the user interface and user interface elements 202-214 can be provided with a plurality of help overlay graphics elements that can be associated with each action element (e.g., buttons 201, 203, etc.) of the user interface elements 202-214. For example, the button 201 can include a help overlay graphics element 222 associated with it. The help overlay graphics element can include a text component/element and an arrow component/element. The text component/element can explain what the particular action element can be designed to do (or what action to perform upon user's input, selection, etc.). The arrow component/element can include a graphical arrow pointing to the action element for which the text component/element provides an explanation of what the action element is designed to do. For example, the help overlay graphics element 222 includes a text component/element that states "Tap to Remove Tile" and an arrow component/element that has an arrow pointing to the button 201. The help overlay graphics element 224 associated with an action element 203 (a "settings" button) of the user interface element 204 includes a text component/element that states "Settings for this tile" and an arrow component/element that has an arrow pointing to the button 203.

The user interface element 206 can include a help overlay graphics element 226 that includes a text component/element that states "Long Tap and Drag to Move Tile" and an arrow component/element that points in a downward direction indicating what the user has to do to perform the action described in the text component/element. The help overlay graphics element 228 is associated with user interface element 208 and includes a text component/element that states "Drag to Resize Tile" and an arrow component/element that points how the user can resize the user interface element 208. The help overlay graphics element 232, which is associated with the user interface element 212, includes a text component/element that states "Swipe to Split Tile" and includes an arrow component/element that has two arrows showing to the user how the user can split the user interface element 212. The help overlay graphics element 234, which is associated with the user interface element 214, can describe for the user what the user can do to zoom (or increase size) of the user interface element 214.

As shown in FIG. 2, the help overlay graphics element 226 can be positioned to span across two user interface elements 204 and 206. In some implementations, the help overlay graphics elements can be positioned so that the help overlay graphics elements do not interfere with or otherwise obscure one another or the action elements that they and/or other help overlay graphics elements show and describe. This is can be accomplished by defining graphical "bounding boxes" around each help overlay graphics element that indicate dimensions of the boxes containing the help overlay graphics elements, where the dimensions can correspond to coordinates on the user interface. The help overlay graphics elements can be positioned on the user interface so that the bounding boxes do not intersect with one another or a predetermined distance or space away from one another. The bounding boxes can include various dimensions that can determine positioning of the bounding boxes on the user interface as well as relative to one another. The dimensions can include length, width, orientation, angles, Cartesian coordinates, pixel coordinates, and/or any other dimension identifiers, coordinates, and/or positioning information, and/or any combination thereof. In some implementations, an algorithm can be used to calculate a specific positioning of each help overlay graphics element's bounding box based on positioning and/or location of the corresponding action element (s), positioning and/or location of other action elements, and/or any other information. Alternatively, the help overlay graphics elements can be positioned on the user interface in any desired fashion. In some implementations, for action elements that may be designed to perform an identical action (e.g., "close" buttons (shown as block dots in FIG. 2), or "settings" buttons (shown as stars in FIG. 2), etc.), a help overlay graphics element may be shown for only one of such action elements and not shown for all others. In some implementations, help overlay graphics elements can be removed from user view when the current subject matter system determines that the user has already learned a particular action that is associated with an action element and described by the help overlay graphics element's text component/element (e.g., the user can learn the action associated with the action element by performing that action). The current subject matter system can determine which help overlay graphics elements may be more important than others and display them appropriately. Such determination can be based on a particular software application, a specific user interface element, a frequency of use of a particular action element in a user interface element, a hierarchy of elements (e.g., an action associated with an action element having nested menus or actions that can be performed by the user (e.g., a "settings" action element can include menus relating to adjustment of sizes, colors, fonts, printing preferences, etc.)), as well as any other parameters, and/or combination of parameters.

In some implementations, the current subject matter can include a database or a table that can store a plurality of help overlay graphics elements that can be associated with a software application, a particular user interface, a specific user interface element, a user device that can be running a plurality of software applications. The database can be organized to allow for ease of extraction of appropriate help overlay graphics elements associated with a particular action element on the user interface. To determine which help overlay graphics element to display, the current subject matter system can ascertain metadata that can be associated with the particular action element and use the ascertained metadata to locate the appropriate help overlay graphics element that is associated with that metadata in the above database and display it on the user interface. The database can be local to the user's computing device displaying the user interface and/or can be remotely located, where the user's computing device can access the database to obtain appropriate help overlay graphics elements.

In some implementations, the help overlay graphics elements can be associated with a help application that can be integrated into the software application that is being used by the user. The help application can be integrated without causing a disruption to the software application being run by the user's computing device. The current subject matter can be configured to preserve any context generated by the software application (whether or not as a result of actions taken by the user when using the software application). In some implementations, the help overlay graphics elements might not be visible at all times. In some implementations, the help overlay graphics elements can be visible in a specific mode, such as an edit mode of the software application, which can present the help overlay graphics elements. Alternatively, the help overlay graphics elements can be toggled using a special function, and/or in any other fashion.

The current subject matter can allow for configuring of a visual representation of the help overlay graphics elements. Also, an interaction with help overlay graphics elements can be possible, offering further help information and a possibility to further refine help overlay graphics elements based on the existing application context. In some implementations, the user interface elements 202-214 can define whether help overlay graphics elements can exist at all, in which direction they can be positioned, how they can look like and how the interaction with the help overlay graphics elements can behave. Additionally, a group of user interface elements can define a new help overlay graphics element(s) when user interface elements occur in a combination.

In some implementations, the user interface elements can be hierarchically nested in user interface layouts (as shown in FIG. 1 by layout 110). In this case, the current subject matter system can determine an overall help overlay graphics element for the software application (as shown in FIG. 1 by the help overlay graphics element 114). The overlay help overlay graphics element can be determined based on at least one of the following rules: only user interface elements or groups of user interface elements that have a help overlay graphics element are taken into account, only help overlay graphic elements of visible user interface elements are shown, help overlay graphics elements of user interface elements of the same type can be only shown once, if they are identical, the user interface element or group of help overlay graphics elements can be positioned so that they are equally distributed over the user interface and/or user interface element screen without overlapping one another, an arrow to an exact position within the user interface element can be rendered to define a location for user interaction, and/or hierarchy/layout nesting of user interface elements. In some implementations, the equal distribution of the help overlay graphics elements or groups of elements can be based on at least one of the following: different layouts of the user interface elements (e.g., organic, hierarchical, tree layouts, and/or any others); hierarchy of user interface elements; importance of help overlay graphics elements can correspond to the importance of user interface elements (e.g., more important user interface element can have a larger size help overlay graphics elements associated with them, whereas less important user interface elements can have smaller size help overlay graphics elements associated with them), where importance can be determined based on a particular software application, user interface element, user, etc.; historical user interaction with the software application, user interface elements, help overlay graphics elements, etc., whereby higher frequency of use of a user interface element can indicate that the user may be familiar with a particular action element of the user interface element and a help overlay graphics element for that action element might not be necessary as opposed to one that is not frequently used (and vice versa).

In some implementations, the current subject matter system can be advantageous for a variety of computing devices, e.g., personal computers, laptops, mobile telephones, smartphones, tablet computers, and/or any other mobile and/or stationary computing devices. On some of these devices conventional methods for obtaining help for action elements of user interfaces might not be easily available. Furthermore, some of the device can include a reduced screen size which can demand an efficient and highly context sensitive help. Thus, the dynamical and smart positioning of help overlay graphics elements discussed above can provide a solution to an integrated and intuitive help information system for any software application.

In some implementations, the current subject matter system can be used in any software application to provide an in-place, context sensitive and dynamical build-in application help. The current subject matter system can provide an optimal way to users to understand the software application and ease user-application interaction. This can be useful in software applications that can include an edit mode (as shown in FIG. 2, for example) to freely configure a hierarchical tile or window layout. Using the help application described above, help overlay graphics elements can explain what manipulations to the user interface can be available. The help overlay graphics elements can be dynamically positioned and arranged/re-arranged, as the tiles/windows (user interface elements) can be changed, re-sized, moved, and/or otherwise manipulated. Thus, the current subject matter can take into account the manipulations that the user may perform on the user interface element, which can trigger change in positioning of the help overlay graphics elements, displaying of other help overlay graphics elements, removing help overlay graphics elements from view, and/or performing any other operations.

Figure 3:
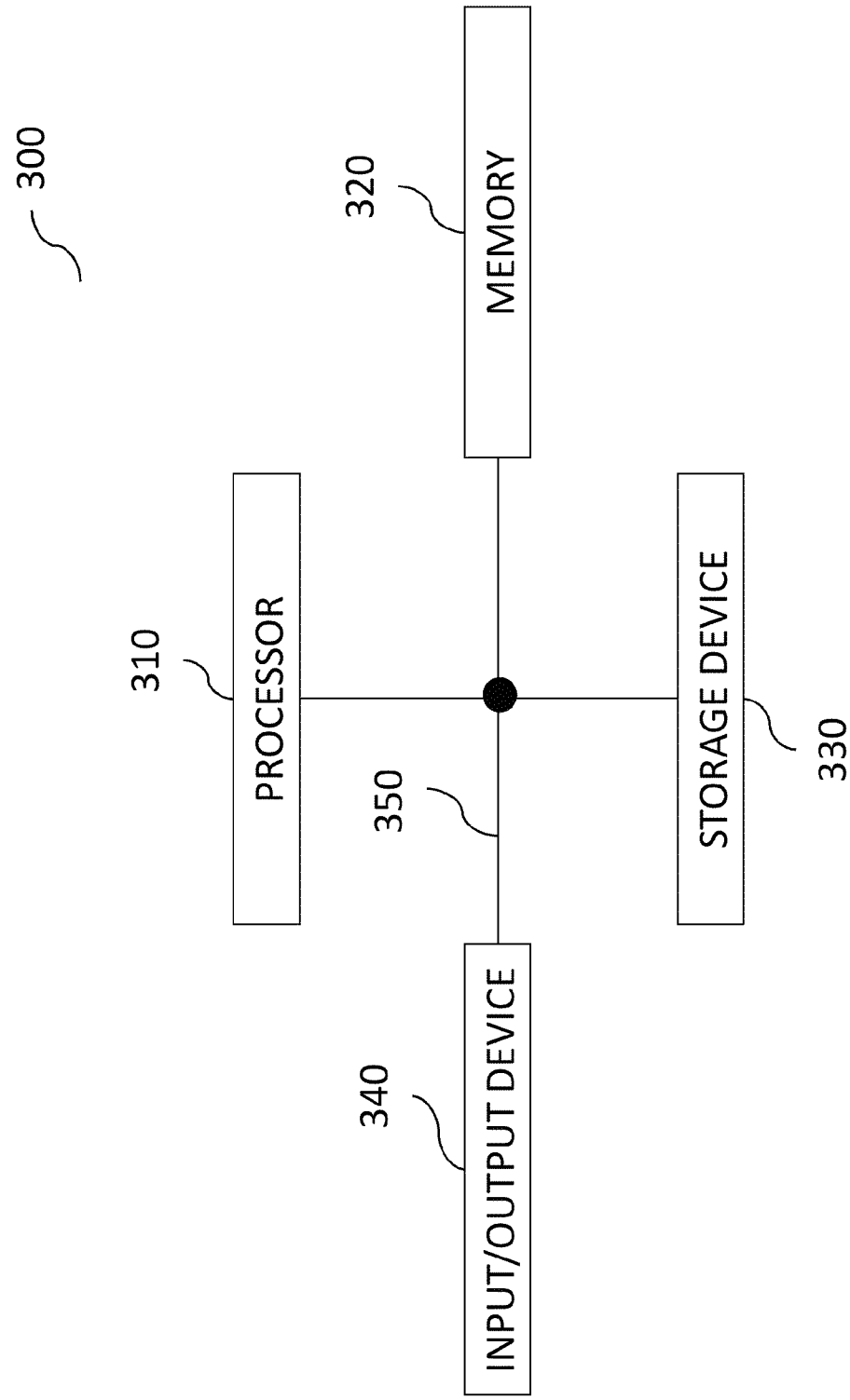
FIG. 3 illustrates an exemplary system, according to some implementations of the current subject matter.

In some implementations, the current subject matter can be configured to be implemented in a system 300, as shown in FIG. 3. The system 300 can include a processor 310, a memory 320, a storage device 330, and an input/output device 340. Each of the components 310, 320, 330 and 340 can be interconnected using a system bus 350. The processor 310 can be configured to process instructions for execution within the system 300. In some implementations, the processor 310 can be a single-threaded processor. In alternate implementations, the processor 310 can be a multi-threaded processor. The processor 310 can be further configured to process instructions stored in the memory 320 or on the storage device 330, including receiving or sending information through the input/output device 340. The memory 320 can store information within the system 300. In some implementations, the memory 320 can be a computer-readable medium. In alternate implementations, the memory 320 can be a volatile memory unit. In yet some implementations, the memory 320 can be a non-volatile memory unit. The storage device 330 can be capable of providing mass storage for the system 300. In some implementations, the storage device 330 can be a computer-readable medium. In alternate implementations, the storage device 330 can be a floppy disk device, a hard disk device, an optical disk device, a tape device, non-volatile solid state memory, or any other type of storage device. The input/output device 340 can be configured to provide input/output operations for the system 300. In some implementations, the input/output device 340 can include a keyboard and/or pointing device. In alternate implementations, the input/output device 340 can include a display unit for displaying graphical user interfaces.

Figure 4:
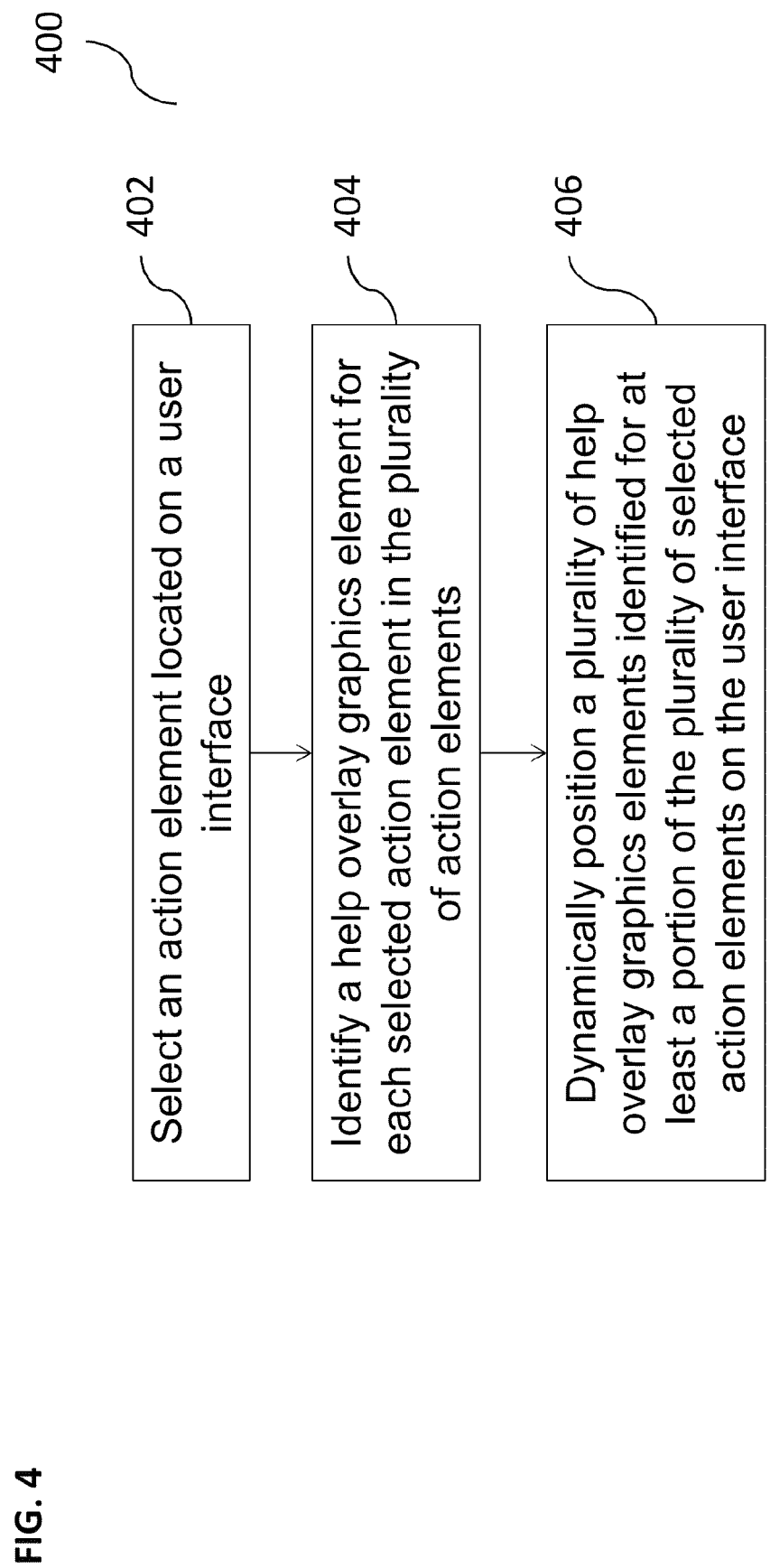
FIG. 4 illustrates an exemplary method, according to some implementations of the current subject matter.

FIG. 4 illustrates an exemplary method 400, according to some implementations of the current subject matter. At 402, an action element located on a user interface can be selected. The user interface can include a plurality of action elements. Each action element can correspond to an action performable by a user that can cause a change in a state of the user interface. As discussed above, such actions can be specific to applications that can have a user interface displayed on the user's computing device. For example, the actions can involve closing an application window, opening a settings window, resizing an application window, and/or any other actions.

At 404, a help overlay graphics element for each selected action element in the plurality of action elements can be identified. The help overlay graphics element can describe the action corresponding to the selected action element. The existence of help overlay graphics elements can be dependent on the action elements existing on the user interface. In some implementations, the action elements can determine whether a corresponding help overlay graphics element exists or does not exist. In some implementations, one action element may not have a corresponding help overlay graphics element while another action element may have one or more corresponding help overlay graphics elements. Existence of the help overlay graphics elements can depend on at least one of the following: whether action elements correspond to an identical action, whether the user already learned a similar action, whether the action does not require an explanation, and/or any other reasons.

At 406, the help overlay graphics elements can be dynamically positioned on the user interface. The current subject matter system can dynamically position at some of the help overlay graphics elements that correspond to at least some of the action elements. This can be done to prevent "overcrowding" of the user interface with a lot of help overlay elements. The help overlay graphics elements can be positioned proximate to associated action elements. In some implementations, a position of one help overlay graphics element can be dependent on a position of another help overlay graphics element. The help overlay graphics elements can be positioned so that they do not overlap one another and do not obscure action elements for which they are provided as well as action elements for which other help overlay action elements are provided.

As discussed above, the elements can be dynamically positioned based bounding boxes that can be defined for them. As stated above, the bounding boxes can include various dimensions that can be used to ascertain positioning of the boxes containing help overlay elements on the user interface as well as relative to one another. The dimensions can include length, width, orientation, angles, Cartesian coordinates, pixel coordinates, and/or any other dimension identifiers, coordinates, and/or positioning information, and/or any combination thereof. In some implementations, the current subject matter system can include an algorithm that can calculate specific positioning of each help overlay graphics element's bounding box based on positioning and/or location of the corresponding action element(s), positioning and/or location of other action elements, and/or any other information. The algorithm can also determine whether or not to display a particular help overlay graphics element that corresponds to a specific action element, which can take into account factors discussed above in connection with FIGS. 1 and 2.

In some implementations, at least one of the selecting operation, the identifying operation, and the dynamically positioning operation can be performed using at least one processor.

In some implementations, the current subject matter can be configured to include one or more of the following optional features. The computer implemented method can include displaying a plurality of help overlay graphics elements corresponding to the plurality of action elements. The displayed help overlay graphics elements can be displayed without overlapping each other on the user interface. As stated above, the current subject matter system can determine which of the plurality of help overlay graphics elements to display on the user interface and where.

In some implementations, the current subject matter can display a first help overlay graphics element corresponding to a first action element and not display a second help overlay graphics element corresponding to a second action element. For example, this can be applicable in situations where some help overlay graphics elements may be considered to be more important, more frequently used, etc. than others (e.g., a settings button menu versus changing thickness of lines in a table in a word processing application, where the settings button may be considered more important and/or more frequently used than the other action element).

In some implementations, the help overlay graphics element can include a text graphic describing the action corresponding to the selected action element and an arrow graphic pointing to a location of the selected action element on the user interface.

In some implementations, the current subject matter system can determine that the user interface includes at least two action elements each corresponding to the same action (e.g., two windows of a presentation application that are being displayed on the user interface and each having a settings button, as shown in FIG. 2). The current subject matter system can then display a help overlay graphics element corresponding to one of the two action elements. This way the user interface is not filled with identical help overlay graphics elements.

In some implementations, the current subject matter system can also prevent displaying of a help overlay graphics element corresponding to an action element corresponding to an action previously performed by a user. If the user already learned a particular feature of a program for which a help overlay graphics element was previously displayed on the screen, it can be determined that the user is proficient in it and hence, does not require further help. This can be accomplished by setting an indicator or a flag associated with the learned action element and/or corresponding help overlay graphics element indicating that the action element has been mastered by the user.

In some implementations, in order to determine which help overlay graphics element to display for an action element, the current subject matter system can obtain metadata associated with that action element and identify the help overlay graphics element based on the metadata. The metadata can include an identifier that can be used to search for and obtain a corresponding help overlay graphics element from a database, for example.

In some implementations, the current subject matter system can display the help overlay graphics element based on at least one of the following: a visibility of at least one action element on the user interface, an importance of the help overlay graphics element, and a historical usage of the help overlay graphics element. Further, action elements can determine whether a corresponding help overlay graphics element can exist on the user interface, how the corresponding help overlay graphics element should appear on the user interface (e.g., font, style, size, etc.), the position and/or direction of the corresponding help overlay graphics element on the user interface (i.e., coordinates, location, etc.), and what the behavior of the corresponding help overlay graphics element will be on the user interface (e.g., whether to display the element again on the user interface after the user learned the action, what arrow and/or text elements to include, etc.). In some implementations, at least one action element can include a plurality of corresponding help overlay graphics elements or a group of help overlay graphics elements. Each help overlay graphics element in the group can be displayed on the user interface based on a predetermined order. The order can be determined based on hierarchy of elements within the group (e.g., top of the menu ("settings"), submenu ("print options"), sub-submenu ("printer selection")), frequency of elements, popularity of elements, size of the elements (e.g., length of text, size of arrows, etc.), historical interaction of user with the corresponding action elements, application, and/or help overlay graphics elements in the group.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

selecting an action element of a plurality of action elements located on a user interface;

identifying a help overlay graphics element for each of the plurality of action elements, wherein each of the plurality of help overlay graphics elements describe an action performable by a user for each of the plurality of action elements, and wherein at least one action element of the plurality of action elements includes a plurality of corresponding help overlay graphics elements with each help overlay graphics element in the plurality of corresponding help overlay graphics element being displayed on the user interface in a predetermined hierarchical order;

positioning each of the plurality of help overlay graphics elements corresponding to each of the plurality of action elements on the user interface, wherein a first help overlay graphics element is positioned proximate to a first action element of the plurality of action elements and a second help overlay graphics element is positioned proximate to a second action element of the plurality of action elements, wherein a first position of the first help overlay graphics element is dependent on a second position of the second help overlay graphics element; and determining, based on a user familiarity with the first action element, whether to remove the first help overlay graphics element of the plurality of help overlay graphics elements, wherein the user familiarity is determined based on a frequency of user interactions with the first action element, and further determining whether the first action element and the second action element correspond to a similar action and, upon determining that the first action element and the second action element correspond to the similar action, displaying only one of the first help overlay graphics element and the second help overlay graphics element;

wherein at least one of the selecting, the identifying, the positioning, and the determining is performed using at least one processor.

2. The method according to claim 1, wherein the positioning further comprises:

determining coordinates of each of the plurality of action elements on the user interface; and determining positioning coordinates of the plurality of help overlay graphics elements using at least one of the following: the coordinates of each of the plurality of action elements and coordinates of bounding boxes surrounding each of the help overlay graphics elements;

wherein the plurality of help overlay graphics elements positioned on the user interface are positioned without having their corresponding bounding boxes overlap each other on the user interface.

3. The method according to claim 1, wherein at least one action element of the plurality of action elements determines at least one of the following: existence of a corresponding help overlay graphics element on the user interface, appearance of the corresponding help overlay graphics element on the user interface, positioning and direction of the corresponding help overlay graphics element on the user interface, and behavior of the corresponding help overlay graphics element on the user interface.

4. The method according to claim 1, wherein the identifying further comprises:

obtaining a metadata associated with the first action element; and identifying, based on the obtained metadata, the first help overlay graphics element.

5. The method according to claim 1, wherein each help overlay graphics element includes a text graphic describing the action performable by the user and an arrow graphic pointing to a location of an associated action element on the user interface.

6. A non-transitory computer-readable medium including code that, when executed by at least one programmable processor, cause the at least one programmable processor to perform operations comprising:

selecting an action element of a plurality of action elements located on a user interface;

identifying a help overlay graphics element for each of the plurality of action elements, wherein each of the plurality of help overlay graphics elements describe an action performable by a user for each of the plurality of action elements, and wherein at least one action element of the plurality of action elements includes a plurality of corresponding help overlay graphics elements with each help overlay graphics element in the plurality of corresponding help overlay graphics element being displayed on the user interface in a predetermined hierarchical order;

positioning each of the plurality of help overlay graphics elements corresponding to each of the plurality of action elements on the user interface, wherein a first help overlay graphics element is positioned proximate to a first action element of the plurality of action elements and a second help overlay graphics element is positioned proximate to a second action element of the plurality of action elements, wherein a first position of the first help overlay graphics element is dependent on a second position of the second help overlay graphics element; and determining, based on a user familiarity with the first action element, whether to remove the first help overlay graphics element of the plurality of help overlay graphics elements, wherein the user familiarity is determined based on a frequency of user interactions with the first action element, and further determining whether the first action element and the second action element correspond to a similar action and, upon determining that the first action element and the second action element correspond to the similar action, displaying only one of the first help overlay graphics element and the second help overlay graphics element;

wherein at least one of the selecting, the identifying, the positioning, and the determining is performed using at least one processor.

7. The non-transitory computer-readable medium according to claim 6, wherein the positioning further comprises:

determining coordinates of each of the plurality of action elements on the user interface; and determining positioning coordinates of the plurality of help overlay graphics elements using at least one of the following: the coordinates of each of the plurality of action elements and coordinates of bounding boxes surrounding each of the help overlay graphics elements;

wherein the plurality of help overlay graphics elements positioned on the user interface are positioned without having their corresponding bounding boxes overlap each other on the user interface.

8. The non-transitory computer-readable medium according to claim 6, wherein at least one action element of the plurality of action elements determines at least one of the following: existence of a corresponding help overlay graphics element on the user interface, appearance of the corresponding help overlay graphics element on the user interface, positioning and direction of the corresponding help overlay graphics element on the user interface, and behavior of the corresponding help overlay graphics element on the user interface.

9. The non-transitory computer-readable medium according to claim 6, wherein the identifying further comprises:
obtaining a metadata associated with the first action element; and
identifying, based on the obtained metadata, the first help overlay graphics element.

10. A system comprising:
at least one programmable processor; and
at least one memory including code that, when executed by at least one programmable processor, cause the at least one programmable processor to perform operations comprising:
selecting an action element of a plurality of action elements located on a user interface;
identifying a help overlay graphics element for each of the plurality of action elements, wherein each of the plurality of help overlay graphics elements describe an action performable by a user for each of the plurality of action elements, and wherein at least one action element of the plurality of action elements includes a plurality of corresponding help overlay graphics elements with each help overlay graphics element in the plurality of corresponding help overlay graphics element being displayed on the user interface in a predetermined hierarchical order;
positioning each of the plurality of help overlay graphics elements corresponding to each of the plurality of action elements on the user interface, wherein a first help overlay graphics element is positioned proximate to a first action element of the plurality of action elements and a second help overlay graphics element is positioned proximate to a second action element of the plurality of action elements, wherein a first position of the first help overlay graphics element is dependent on a second position of the second help overlay graphics element; and
determining, based on a user familiarity with the first action element, whether to remove the first help overlay graphics element of the plurality of help overlay graphics elements, wherein the user familiarity is determined based on a frequency of user interactions with the first action element, and further determining whether the first action element and the second action element correspond to a similar action and, upon determining that the first action element and the second action element correspond to the similar action, displaying only one of the first help overlay graphics element and the second help overlay graphics element;
wherein at least one of the selecting, the identifying, the positioning, and the determining is performed using at least one processor.

* * * * *